Sept. 22, 1931.  F. W. SPERR, JR  1,824,104
AERATION AND GAS PURIFICATION PROCESS
Filed April 9, 1925   2 Sheets-Sheet 1
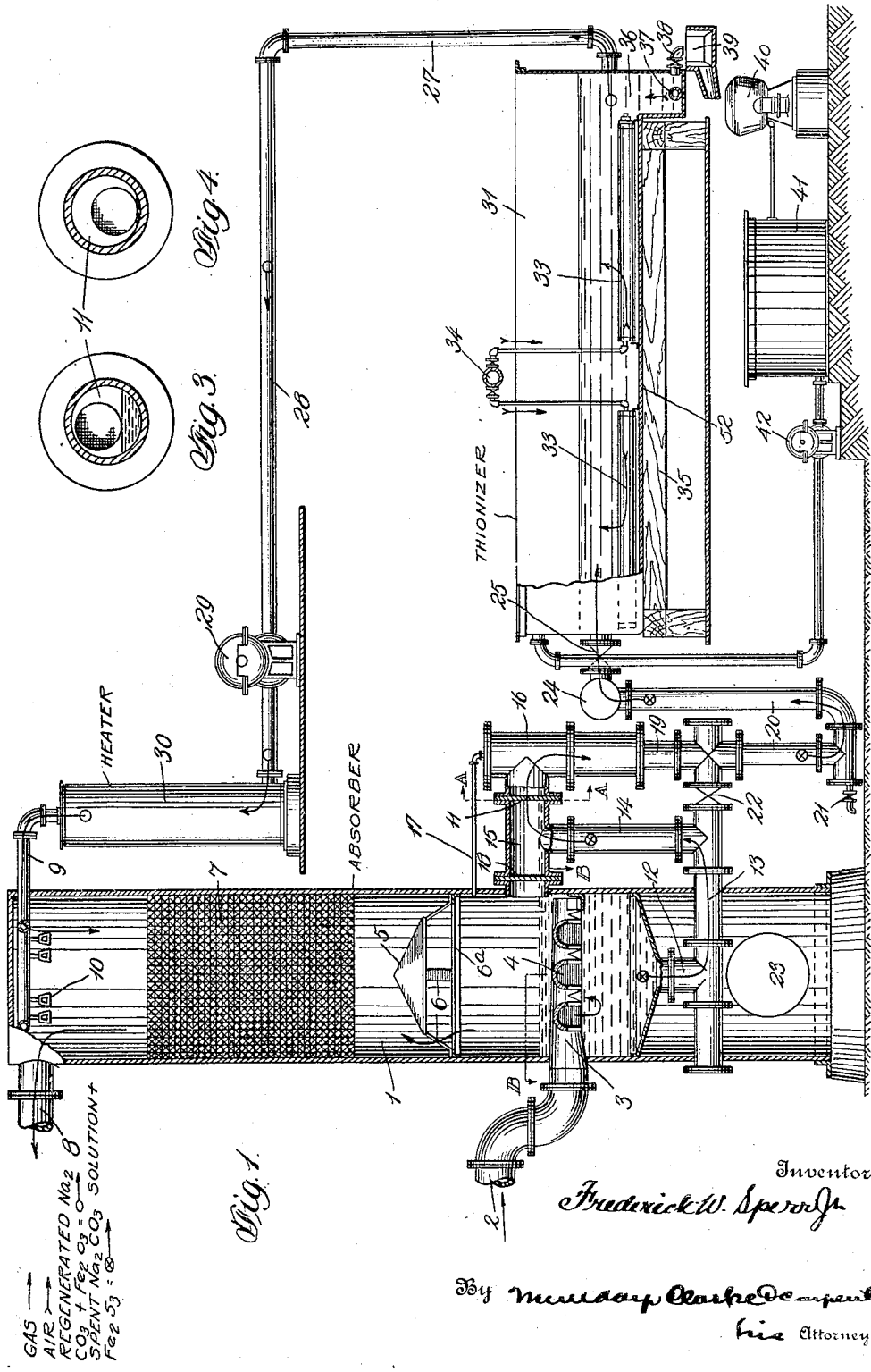

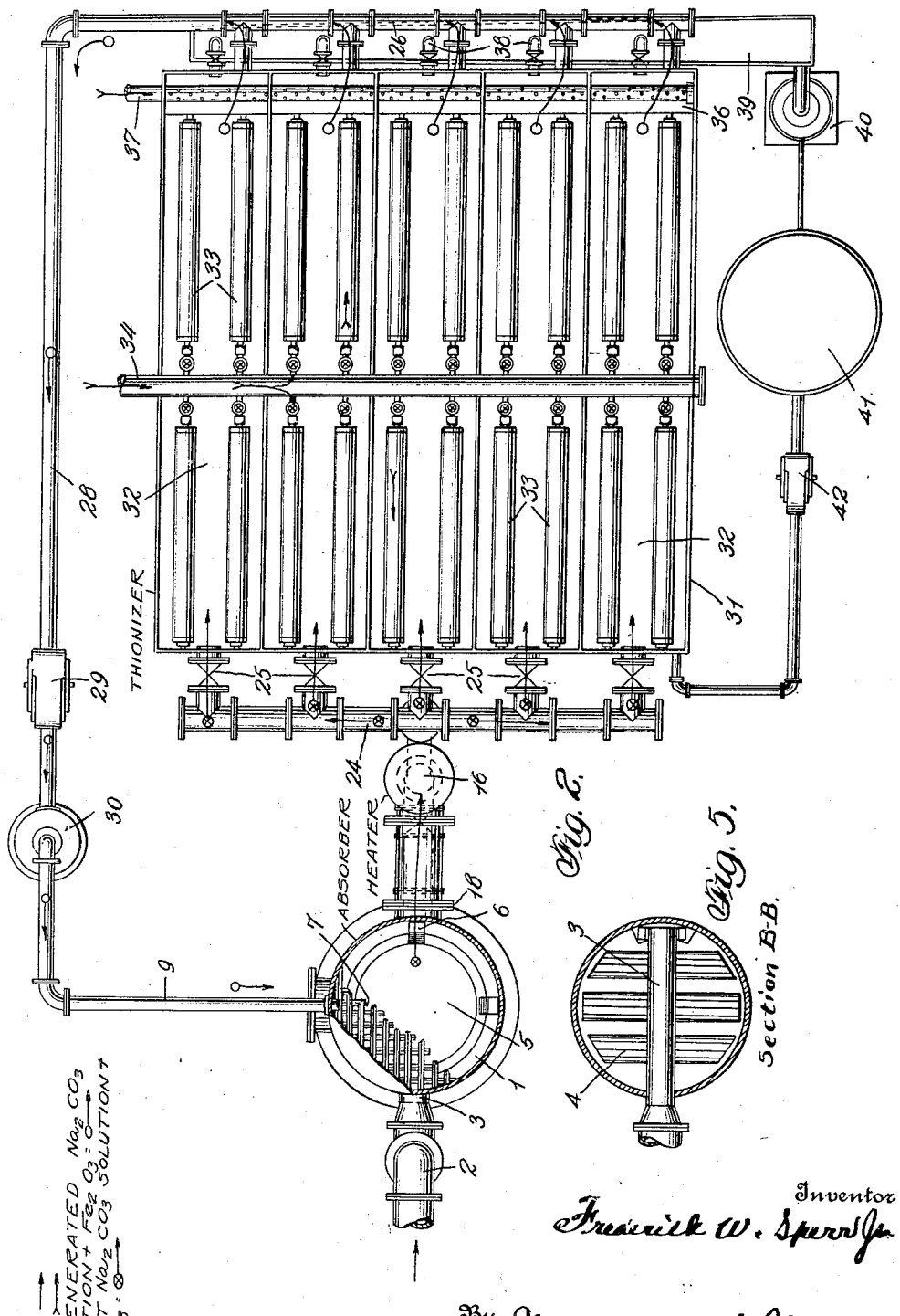

Patented Sept. 22, 1931

1,824,104

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

AERATION AND GAS PURIFICATION PROCESS

Application filed April 9, 1925. Serial No. 21,983.

This invention relates to a process and apparatus for the elimination of hydrogen sulphide and other impurities from fuel gases, for example, coal gas, water gas, and the like, by liquid purification employing a suspension of an iron compound in an alkaline liquid, which may be revivified for further use by aeration.

The primary objects of the invention are to accelerate the purification of the gas and to facilitate the separation of elemental sulphur from the liquid after it has been transferred thereto from the gas.

The invention consists in maintaining the liquid entering the washing stage at a temperature of at least 85° F.; and also in employing a very finely pulverized iron compound in preparing the purifying liquid.

The apparatus according to the invention comprises an absorber wherein the hydrogen sulphide is washed out of the gas, an aerator for revivifying the spent wash liquid, and a heater for heating the revivified liquid passing from the areator to the absorber.

The invention further consists in such other new and useful improvements, and has for further objects such other operative advantages or results, as may be found to obtain in the processes and apparatus hereinafter described or claimed.

In the accompanying drawings forming part of this specification and showing for purposes of exemplification certain form and manner in which the invention may be embodied and practiced but without limiting the claimed invention to such illustrative instances:

Figure 1 is an elevation of a complete installation for carrying out the process;

Figure 2 is a plan view of the installation; and

Figures 3, 4 and 5 are detail views, Figs. 3 and 4 being sections on the line A—A of Fig. 1, and Fig. 5 a section through the absorber on the line B—B of Fig. 1.

In the drawings, 1 denotes an absorber or scrubber of the saturator type, into which the raw gas enters through an inlet pipe 2.

The lower part of the absorber tower has "cracker pipes" 4, to which the gas is conducted through a manifold 3. The gas bubbles through the liquid into which these "cracker pipes" dip, and then passes up round a baffle 5 and through the upper part of the tower which may be filled with hurdles 7.

According to the invention the baffle 5 is concentric with the tower and is of conical form; it has the function of preventing any spray from the bubbling section from splashing up on to the hurdles and also has other useful purposes, such as catching and deflecting the liquid from the hurdles so that it will wash down the sides of the absorber and remove any solid matter that may there be deposited. The baffle is supported by legs 6, attached to an angle iron 6ª, secured to the wall of the tower.

The hurdles may be replaced by other types of filling material or may be omitted altogether. In fact this particular form of scrubber is not essential in carrying out this invention but may be replaced by other kinds of scrubber, for example the apparatus described in my United States Patent No. 1,715,253.

The gas from which the impurities have been removed by the circulated liquid passes out through a pipe 8.

The impurity absorbing liquid enters the upper part of the absorber through a pipe 9, and is distributed by sprays 10. The operation is such that the lower part of the absorber is kept partly filled with the liquid, the level of which is controlled by an eccentrically apertured disc 11, which is shown in different possitions in Figs. 3 and 4. The liquid passes out through pipes 12, 13, 14 and 15, through the aperture in disc 11, to a separator 16, which is vented back to the tower by a pipe 17. Flanges 18 are ordinarily blanked to prevent by-passing of the liquid.

The liquid then passes down through a pipe 19, to a seal 20 which has a drain 21. The pipe 13 has a direct connection with the pipe 19 which connection contains a valve 22 which is ordinarily kept closed but may be opened from time to time to wash out any sediment. An opening 23 is provided in the shell of the tower to make the piping accessible.

From the seal 20, the liquid passes through a manifold 24, from which it is distributed through valves 25, to the various compartments of the aerator or "thionizer." From this the liquid passes through a manifold 26, and thence according to the invention, is pumped through pipes 27 and 28, by pump 29, through a heater 30, and back to the absorber.

The thionizer tank 31 has several compartments 32, each of which may contain one or more of the tubular aerators 33, and these tubes may be arranged either longitudinally or transversely. The tubes are connected with an air manifold 34. The construction and operation of the tubular aerators is in accordance with the invention described in specification Serial No. 21,978, Patent No. 1,755,614.

The tank is shown supported on platform 35, and has a depressed portion 36, which has a perforated air pipe 37 and outlets 38. The sulphur accumulates in this depressed portion and, according to the invention, is drawn off as a sludge into a trough 39, from which it goes to a centrifuge 40. The liquid drained from the centrifuge goes to a sump 41, and is pumped by a pump 42 back to the thionizer tank. Instead of withdrawing the sulphur in this way, portions of the suspension in which the sulphur has accumulated may periodically be withdrawn from the system and centrifuged. The crude sulphur may be treated for separation of any iron oxide which it may contain and this may be returned to the system.

The perforated air pipe 37 is utilized for keeping the sulphur sludge in suspension during periods when it is not desired to withdraw any of this sludge from the system. The depressed portion 36 of the tank is advantageous for collecting the sulphur because it is free from the air bubbles of the aerating tubes which tend to keep the sulphur in suspension. The trough 39 may be equipped with mechanical scrapers to convey the sulphur to the centrifuge. Instead of a centrifuge a filter may be advantageously employed. Instead of employing the heater 30, other means for heating the solution may be used; for example, the gas entering the absorber or the air entering the thionizer may be heated. Heating means may be placed directly in the thionizer compartments. The heating of the liquid may be assisted by adding steam directly to the solution and this may be done in combination with the operation of the heater 30 in such a way that the steam directly condensed in the solution is sufficient to compensate for evaporation losses.

The preferred agent for the elimination of the hydrogen sulphide from the gas is a suspension of finely pulverized hydrated ferric oxide in a solution of sodium carbonate. Other iron compounds reactive to hydrogen sulphide may be substituted for the hydrated ferric oxide. For example, such compounds as ferric carbonate, ferric hydroxide, ferric sulphide, ferrous carbonate or ferrous hydroxide may be used. But when ferrous compounds are employed they should be added to the suspension just before it is subjected to the necessary oxidizing treatment, because if such ferrous compounds are allowed to come into contact with hydrogen sulphide before being oxidized to the ferric state they will form ferrous sulphide which is much less susceptible to oxidation than is the ferric sulphide.

In the assignee's copending prior application Ser. No. 718,253, filed June 6, 1924, Patent No. 1,578,560, emphasis was laid on the use of a freshly precipitated iron compound in a process for a similar purpose, which was also done in the assignee's copending application Ser. No. 730,676, filed Aug. 7, 1924, Patent No. 1,656,881, and it was pointed out that natural iron oxide is relatively less active than is desirable and that even the precipitated material prepared and stored for some time loses some of its effectiveness. It has now been found that if natural oxides such as bog iron ore are very finely pulverized, for example, by grinding in a ball mill so that the pulverized material will pass completely through a sieve of 200 meshes per inch and that if this pulverized material is employed in suspension in alkaline solution at a temperature of not less than 85° F., excellent results are obtained both with respect to the removal of hydrogen sulphide and to the regeneration of the suspension. Moreover, precipitated iron compounds which have lost much of their activity through storage may be thus finely pulverized and employed in heated suspension with excellent results. For example, use has been made of the iron oxide which is a by-product of aniline manufacture. This material when pulverized in a ball mill for about 8 hours so that all of it passes through a 200-mesh sieve gives excellent results when employed in the heated suspension described.

In the assignee's prior application Ser. No. 730,676, filed June 6, 1924, and also in part of the assignee's application Ser. No. 21,978, filed of even date herewith, there is described the removal of the free sulphur from the suspension in the oxidation stage in the form of a foamy mass. This method of removal is attended with certain disadvantages since the foam is very bulky and a large volume of it must be handled in order to produce a relatively small quantity of sulphur, which requires the use of larger apparatus than would be necessary if the sulphur could be removed in more concentrated form. The employment of the heated suspension according to the present invention eliminates the production of foam so that the sulphur can be recovered by settling in the form of a relatively heavy sludge which may be readily filtered or centrifuged. The pulverized iron oxide is added to the system from time to time to maintain about 1% of $Fe_2O_3$ in suspension. This amount may, however, be considerably varied and in practice from 0.2 to 3.0% $Fe_2O_3$ have been used. When a single scrubber is employed the alkilinity of the liquid in the system is usually maintained at the equivalent of about 3% sodium carbonate. If desired, a plurality of absorbers may be used and the first operated with a very low alkalinity, as described in accordance with the invention of the assignee's application Serial No. 21,982, filed of even date herewith.

The reactions effecting the removal of hydrogen sulphide and the formation of free sulphur are essentially as follows:

In the absorber the hydrogen sulphide reacts with the alkali, preferably sodium carbonate in the wash liquid, forming sodium hydrosulphide

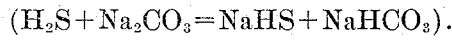
$(H_2S + Na_2CO_3 = NaHS + NaHCO_3)$.

The sodium hydrosulphide reacts with ferric oxide and sodium bicarbonate in the liquid,

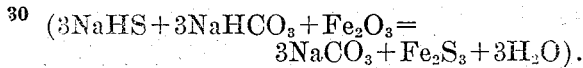
$(3NaHS + 3NaHCO_3 + Fe_2O_3 = 3NaCO_3 + Fe_2S_3 + 3H_2O)$.

The hydrogen sulphide may also react with the sodium bicarbonate or directly with the ferric oxide, and ferric carbonate may be formed and enter into the reactions, but the important thing is the production of ferric sulphide, and for this purpose it is important that ferric compounds be used, or if ferrous compounds are employed in the system they should, as far as possible, be oxidized to ferric compounds before entering the absorber. Accordingly when ferrous compounds are used they are introduced directly into the thionizer compartments near the solution inlet.

In the thionizer compartments the essential reaction is as follows:

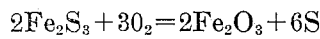
$2Fe_2S_3 + 3O_2 = 2Fe_2O_3 + 6S$

Part or all of the ferric oxide may be hydrated by reaction with water and ferric carbonate or basic carbonate may also be formed.

It has been found that the reaction between the sodium hydrosulphide and ferric oxide and the reaction between the ferric sulphide and oxygen are greatly accelerated by maintaining the solution at a temperature at or exceeding 85° F. For example, in large scale apparatus having capacity to purify 1,000,000 cubic feet of gas per 24 hours at this temperature the capacity was reduced to less than 500,000 cubic feet per 24 hours when the temperature was decreased to 60° F. It has been also found that at the higher temperature much less air is required to effect the oxidation of the ferric sulphide and the time during which the suspension must be maintained in the oxidation stage is considerably reduced.

Practically all of the hydrocyanic acid content in the gas is also removed by the process of this invention.

The invention as hereinabove set forth or exemplified may be variously practiced or embodied within the scope of the claims hereinafter made.

I claim:

1. A process for the elimination of hydrogen sulphide and other impurities from fuel gases comprising washing the gas with a liquid containing an alkaline sodium compound in solution and an iron compound, thereby characterized that the liquid entering the washing stage is maintained at a temperature of at least about 85° F.

2. A process as claimed in claim 1, thereby characterized that the iron compound employed is finely pulverized before its addition to the liquid.

3. A process as claimed in claim 1, in which the iron compound employed is of the type of the natural oxide Bog iron ore.

4. A process as claimed in claim 1, comprising the steps of aerating the spent liquid discharged from the washing stage while substantially so heated with resulting re-oxidizing of the iron sulphide in said liquid and formation of sulphur, and removing an accumulation of the sulphur from an accumulation thereof in the liquid.

5. A process as claimed in claim 1, in which the iron compound is employed in suspension in a solution of sodium carbonate.

6. A process as claimed in claim 1, in which the iron compound contents of the liquid are maintained at from 0.2 to 3% of ferric oxide.

7. A process as claimed in claim 1, in which iron renewals to the liquid are affected by adding a ferrous compound in or just prior to the entrance of the liquid into the aeration stage.

8. A process for the elimination of hydrogen sulphide and the like from gases which consists in washing the gas with solution of a non-volatile alkali containing an iron compound and maintaining the solution at a temperature of not less than 85° F. during said washing.

9. A process for the elimination of hydrogen sulphide and the like from gases which consists in washing the gas with solution of a non-volatile alkali containing pulverized hydrated finely divided ferric oxide; maintaining the solution at a temperature of not less than about 85° F. during said washing; and making additions of finely divided ferric oxide to the liquid, the added ferric oxide being added as a finely pulverized one.

10. A prcoess for elimination the of hydrogen sulphide and the like from gases which consists in washing the gas with a sodium carbonate solution containing an iron compound and maintaining the solution at a temperature of not less than about 85° F.

11. A process for the eliminatiton of hydrogen sulphide and the like from gases which consists in washing the gas with a sodium carbonate solution containing pulverized hydrated ferric oxide and maintaining the solution at a temperature of not less than about 85° F. during said washing.

12. A process for the elimination of hydrogen sulphide and the like from gases which consists in washing the gas with an alkaline solution containing an iron compound pulverized to about 200 mesh fineness and maintaining the solution at a temperature of not less than about 85° F.

13. A process for the elimination of hydrogen sulphide and the like from gases which consists in washing the gas with an alkaline solution containing pulverized hydrated ferric oxide pulverized to about 200 mesh fineness and maintaining the solution at a temperature of not less than about 85° F.

14. A process for the elimination of hydrogen sulphide and the like from gases which consists in washing the gas with an alkaline solution of a non-volatile alkali and containing an iron compound and maintaining the solution at a temperature of not less than 85° F., discharging the spent solution from the gas washing stage, accumulating the discharged spent solution in a body separate from the gas washing stage, passing air through said body of spent solution and thereby aerating the fouled solution to regenerate it with liberation of free sulphur, returning regenerated solution to the gas washing stage, effecting such aeration while the fouled solution is at substantially the same temperature to eliminate substantial production of foam, and separating the sulphur as a settled sludge from the fouled solution in the aeration stage.

15. A process for the elimination of hydrogen sulphide and the like from gases which consists in washing the gas with an alkaline solution of a non-volatile alkali and containing pulverized hydrated ferric oxide and maintaining the solution at a temperature of not less than about 85° F., discharging the spent solution from the gas washing stage, accumulating the discharged spent solution in a body separate from the gas washing stage, passing air through said body of spent solution and thereby aerating the fouled solution to regenerate it with liberation of free sulphur, returning regenerated solution to the gas washing stage, effecting such aeration while the fouled solution is at substantially the same temperature to eliminate substantial production of foam, and seperating the sulphur as a settled sludge from the fouled solution in the aeration stage.

16. A process for the elimination of hydrogen sulphide and the like from gases which consists in washing the gas with an alkaline solution containing an iron compound pulverized to about 200 mesh fineness and maintaining the solution at a temperature of not less than about 85° F., discharging the spent solution from the gas washing stage, accumulating the discharged spent solution in a body separate from the gas washing stage, passing air through said body of spent solution and thereby aerating the fouled solution to regenerate it with liberation of free sulphur, returning regenerated solution to the gas washing stage, effecting such aeration while the fouled solution is at substantially the same temperature to eliminate substantial production of foam, and separating the sulphur as a settled sludge from the fouled solution in the aeration stage.

17. A process for the elimination of hydrogen sulphide and the like from gases which consists in washing the gas with an alkaline solution containing pulverized hydrated ferric oxide pulverized to about 200 mesh fineness and maintaining the solution at a temperature of not less than about 85° F., discharging the spent solution from the gas washing stage, accumulating the discharged spent solution in a body separate from the gas washing stage, passing air through said body of spent solution and thereby aerating the fouled solution to regenerate it with liberation of free sulphur, returning regenerated solution to the gas washing stage, effecting such aeration while the fouled solution is at substantially the same temperature to eliminate substantial production of foam, and separating the sulphur as a settled sludge from the fouled solution in the aeration stage.

18. A process for the elimination of hydrogen sulphide and the like from gases which consists in washing the gas with an alkaline solution containing in suspension an iron compound, oxidizing the fouled solution-suspension and adding a ferrous compound to the solution-suspension in or prior to the oxidation stage to make up for loss of iron.

In testimony whereof I have hereunto set my hand.

FREDERICK W. SPERR, Jr.